United States Patent [19]

Kibler

[11] 4,133,981

[45] Jan. 9, 1979

[54] TIME CORRECTION CIRCUIT FOR A DIGITAL MULTIPLEXER

[75] Inventor: Lynden U. Kibler, Middletown, N.J.

[73] Assignee: Bell Telephone Laboratories, Incorporated, Murray Hill, N.J.

[21] Appl. No.: 861,865

[22] Filed: Dec. 19, 1977

[51] Int. Cl.² .............................................. H04J 3/06
[52] U.S. Cl. ................................................. 179/15 BS
[58] Field of Search ......... 179/15 AE, 15 BS, 15 AP; 178/50, 69.1; 325/38 B; 340/146.1 D

[56] References Cited

U.S. PATENT DOCUMENTS

| | | | |
|---|---|---|---|
| 3,274,339 | 9/1966 | Herry et al. | 179/15 BS |
| 3,970,796 | 7/1976 | Gyurki | 179/15 BS |

Primary Examiner—Thomas A. Robinson
Attorney, Agent, or Firm—John K. Mullarney

[57] ABSTRACT

This disclosure relates to a time correction circuit that automatically adjusts the time position of each input pulse on each incoming digital line to a digital multiplexer so that each pulse is appropriately positioned to be sampled by the multiplexer into the correct time slot. A time correction circuit is provided on a per line basis. The correction circuit makes a relative comparison of each input pulse with a control pulse derived from the multiplexer sampling pulse and in response thereto it selectively inverts and shortens or lengthens each input pulse. This results in some portion of each input pulse being in the proper time position to be sampled by the multiplexer sampling pulse.

4 Claims, 7 Drawing Figures

TIME CORRECTION CIRCUIT FOR A DIGITAL MULTIPLEXER

BACKGROUND OF THE INVENTION

This invention relates to a time correction circuit which insures that each incoming pulse of each of a multiplicity of incoming digital lines is disposed in the correct time position to be sampled by a digital multiplexer.

Large digital central offices or switching centers in urban areas have to be interconnected. The use of cable (including wire pairs) for this purpose, laid beneath streets, is becoming very expensive. In recent years, for example, the price of telephone cable has been rising sharply because of the increased cost of copper and petroleum-based plastic. Moreover, in rapidly growing areas of the telephone plant, such as the exchange area, the cost of installing new cables has increased significantly. Furthermore, telephone companies are faced with dwindling duct and manhole space. Clearly, one solution to these problems is the use of high frequency radio as an alternative means of interconnection. As a cable substitute, a radio system can be considered simply as a box with input and output terminals. The user connects to the input terminals just as to a cable and the radio system delivers the digital signals to the other end just as from a cable. A principal advantage of a high frequency (60 GHz) transmission system is that it has sufficient bandwidth to handle a large number of digital signals.

Because such a transmission system possesses a potentially large channel capacity (e.g., 50 megabits/sec.), the requisite multiplexer (and demultiplexer) can prove to be relatively complex. For example, in a proposed system, the multiplexer will accept 32 input digital lines (each at the T-1 bit rate of 1.544 megabits/sec.) and multiplex the same into a composite, bit interleaved, serial bit stream (49.408 megabits/sec.). This bit stream would then be modulated onto a carrier for radio transmission to a remote office. Now since the input lines to the multiplexer originate from the same central office, the signals on each input line will typically be locked to the same frequency. This, of course, simplifies the multiplexer design and will lower costs considerably. However, the digital bit streams on the input lines can arrive in random phase at the multiplexer input. Without correction, this randomness in phase between the digital signals on the input lines could result in some lines not being bit sampled or being sampled into the wrong time slot.

SUMMARY OF THE INVENTION

It is a primary object of the invention to insure that each input pulse on each incoming digital line to a digital multiplexer is appropriately positioned to be sampled by the multiplexer into the correct time slot.

A related object of the invention is to provide a time correction circuit that selectively alters each input pulse on each input line to a digital multiplexer so that some portion of each pulse is in the proper time position to be correctly sampled by the multiplexer sampling pulse.

A still further object of the invention is to provide input pulse time correction circuitry for a digital multiplexer that is simple in circuit configuration, yet reliable in operation.

A time correction circuit in accordance with the present invention is respectively provided for each input digital line to a digital multiplexer. The correction circuit serves to make a relative time comparison of each input pulse on the line with a control pulse derived from the multiplexer sampling pulse and in response thereto the correction circuit selectively inverts and shortens or lengthens each input pulse. This results in some portion of each input pulse being in the proper time position to be sampled by the multiplexer sampling pulse.

BRIEF DESCRIPTION OF THE DRAWINGS

The invention will be more fully appreciated from the following detailed description when the same is considered in connection with the accompanying drawings in which.

DETAILED DESCRIPTION

Figure 1:
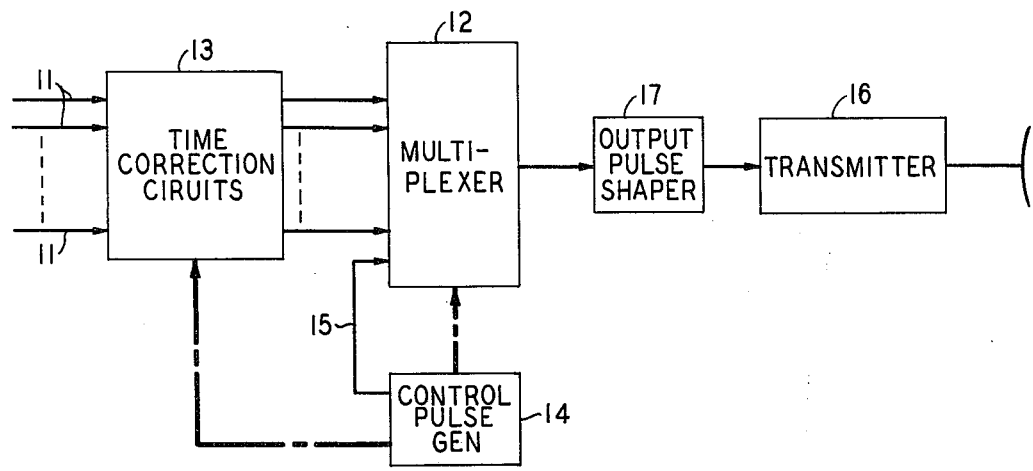
FIG. 1 is a simplified block diagram of a portion of a transmitting terminal incorporating time correction circuitry in accordance with the present invention.
Figure 2:
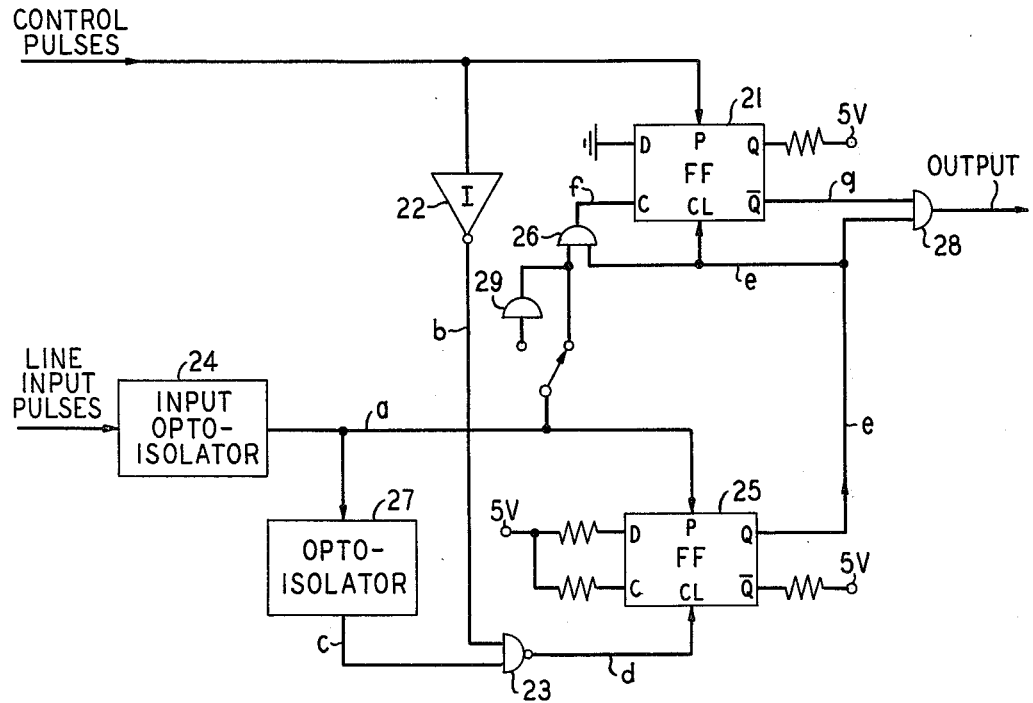
FIG. 2 is a detailed schematic diagram of a time correction circuit according to the invention.

Turning now to FIG. 1 of the drawings, there is shown part of a transmitting terminal of a digital radio transmission system which incorporates time correction circuits in accordance with the present invention. There are 31 input digital lines 11, each carrying a unipolar T-1 bit stream. T-1 transmission (1.544 MHz) is, at present, the workhorse of the Bell System digital transmission system between central offices. For a detailed description of T-1 transmission reference can be had to the articles "The T1 Carrier System" by D. F. Hoth, *Bell Laboratories Record*, November 1962, pp. 358–363 and "The D3 Channel Bank" by W. B. Gaunt et al, *Bell Laboratories Record*, August 1972, pp. 229–233. T-1 carrier is a pulse code modulation (PCM) type of digital transmission with a particular digital format (see the Gaunt et al article), but this format is of no consequence in the consideration of the present invention. The input lines 11 are coupled to the digital multiplexer 12 via the time correction circuits 13 of the invention. A time correction circuit, as shown in detail in FIG. 2, is provided on a per line basis. The control pulse generator 14 serves, for example, to generate the sample pulses which the multiplexer uses to sample, in sequence, each of the input bit streams. The generator 14 also supplies an additional input 15 to the multiplexer 12 which for all practical purposes appears to the multiplexer as another 1.544 MHz digital input bit stream. This latter bit stream is comprised of control signals (e.g., clock and framing pulses) that are necessary for proper operation of the demultiplexer (not shown) at the remote receiving terminal. Finally, the generator 14 supplies 31 time correction signals or control pulses to the 31 time correction circuits 13, which are utilized by the latter in the manner to be described hereinafter. The output of the multiplexer comprises a composite, bit interleaved, serial bit stream (49.408 MHz) which is coupled to the transmitter 16 via the pulse shaper 17. Prior to transmission, the digital signal may be converted to the more conventional bipolar form and then modulated onto a high frequency carrier (e.g., 60 GHz) for transmission to the receiving terminal. The foregoing generalized description of the transmission terminal of FIG. 1 is merely for purposes of illustrating a possible application of the present invention and it is to be understood, therefore, that the transmission terminal including the multiplexer and control generator constitute no part of the present invention. Also, it will be obvious to those in the art that the inventive concepts here disclosed can be utilized irrespective of the transmission terminal circuitry or the nature and bit rate of the incoming digital bit streams.

The time correction circuit in accordance with the present invention is shown in detail in FIG. 2 of the drawings. A correction circuit is provided for each incoming digital line to the multiplexer 12 and results in some portion of each input pulse on each incoming line being in the proper time position to be sampled by the multiplexer sampling pulse. The operation of the circuit can be understood by reference to FIG. 2 and the accompanying waveforms of FIGS. 3–7, wherein letters (a–g) are used to refer to particular waveforms occurring at particular points in the circuit of FIG. 2.

There are two inputs to the time correction circuit, namely, (1) the unipolar input pulses on the line in which the correction circuit is coupled and (2) the wide (e.g., 30 ns) control pulses which are in effect delayed versions of the multiplexer sampling pulses. The control pulses for each input line are derived from the multiplexer sampling pulses for that line. The multiplexer sampling pulses, the input line pulses and the control pulses for a given line are shown in descending succession at the top of FIGS. 3–7.

Referring now to FIG. 2, the negative going control pulses are fed to the P (preset) terminal of the "D" type flip-flop 21. D-type flip-flops are ubiquitous, well known bistable devices manufactured by Western Electric Company, Texas Instruments, Incorporated and numerous others. The control pulses are also inverted by inverter 22 and delivered to the input of NAND gate 23. The positive input line pulses are inverted by the input opto-isolator 24 and then fed to the P (preset) terminal of the D-type flip-flop 25 and to the input of AND gate 26. Here again, opto-isolators are state of the art devices manufactured by Hewlett-Packard and others and typically comprise a light emitting diode and a photodetector. The opto-isolator provides an inversion function and some delay (e.g., 40–50 nanosec.). The output pulses of isolator 24 are inverted again and delayed by the opto-isolator 27 and then delivered to the other input terminal of NAND gate 23. The output of this NAND gate is fed to the CL (clear) terminal of the flip-flop 25. In typical D-type flip-flop operation, the preset and clear inputs operate independently of clock and D inputs and act as over-ride signals. A low preset input sets the Q output of the flip-flop high (Q = 1). A low clear input sets the Q output low (Q = 0). When the preset and clear inputs overlap, the first pulse arriving controls the flip-flop operation and blocks the effect of the other.

The Q output of flip-flop 25 is fed to the input of the output AND gate 28, it is also fed to the CL (clear) terminal of flip-flop 21 and to the other input terminal of AND gate 26. The output of AND gate 26 is delivered to the C (clock) input of flip-flop 21, whose D input is held low by grounding the same. The D-type flip-flop 21 transfers the value of the D input to the Q output on the positive transition of the input clock signal — i.e., the input from AND gate 26. Thus, a positive transition in the input signal to the C terminal of flip-flop 21 causes the Q output to go low (Q = 0) and the $\overline{Q}$ output to go high ($\overline{Q}$ = 1). The $\overline{Q}$ output of flip-flop 21 is fed to the input of the output AND gate 28. The output of the time correction circuit is the output of AND gate 28.

Figure 3:
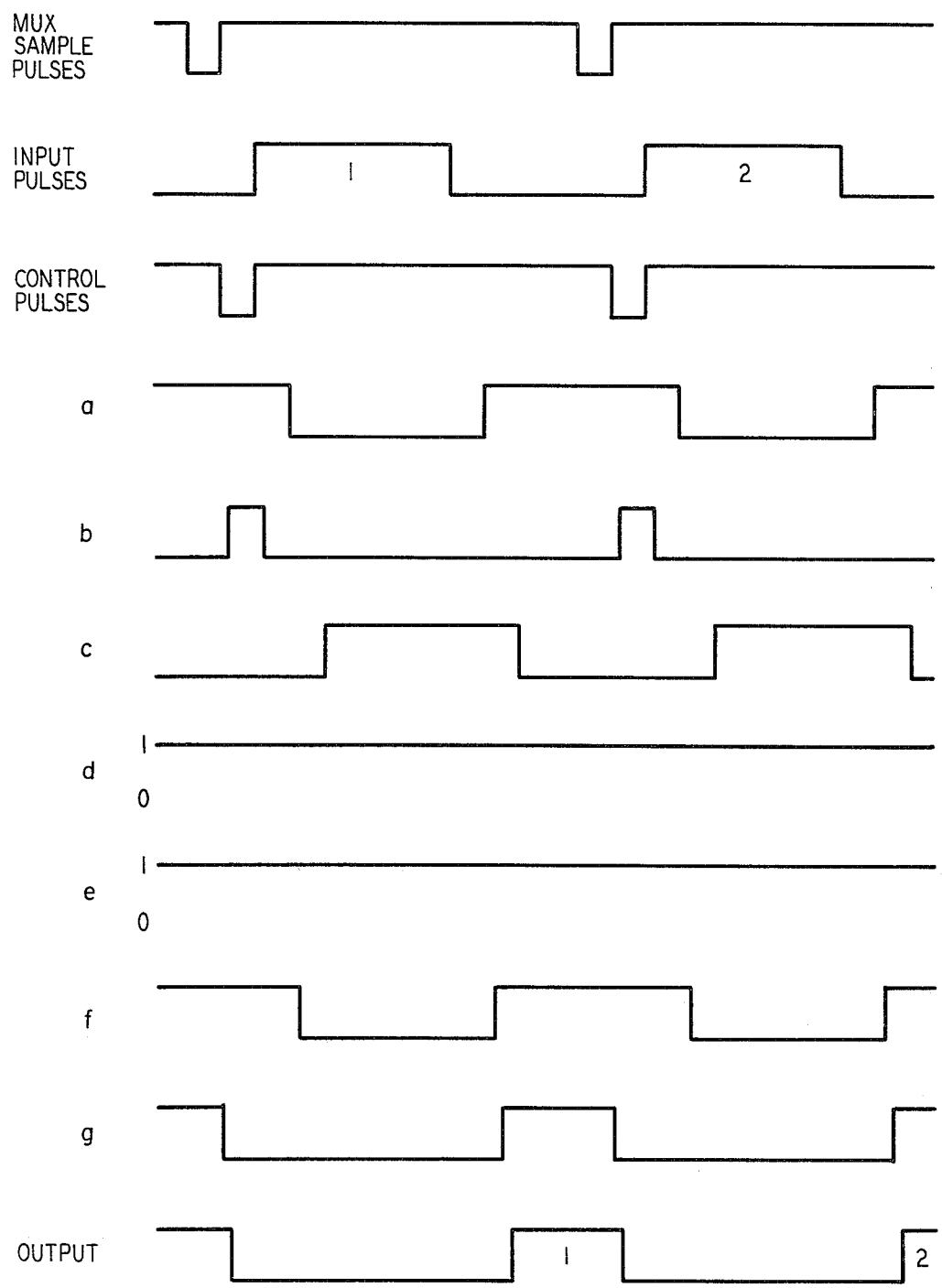
FIGS. 3 through 7 show waveforms that are useful in understanding the operation of the circuit of FIG. 2.
Figure 4:
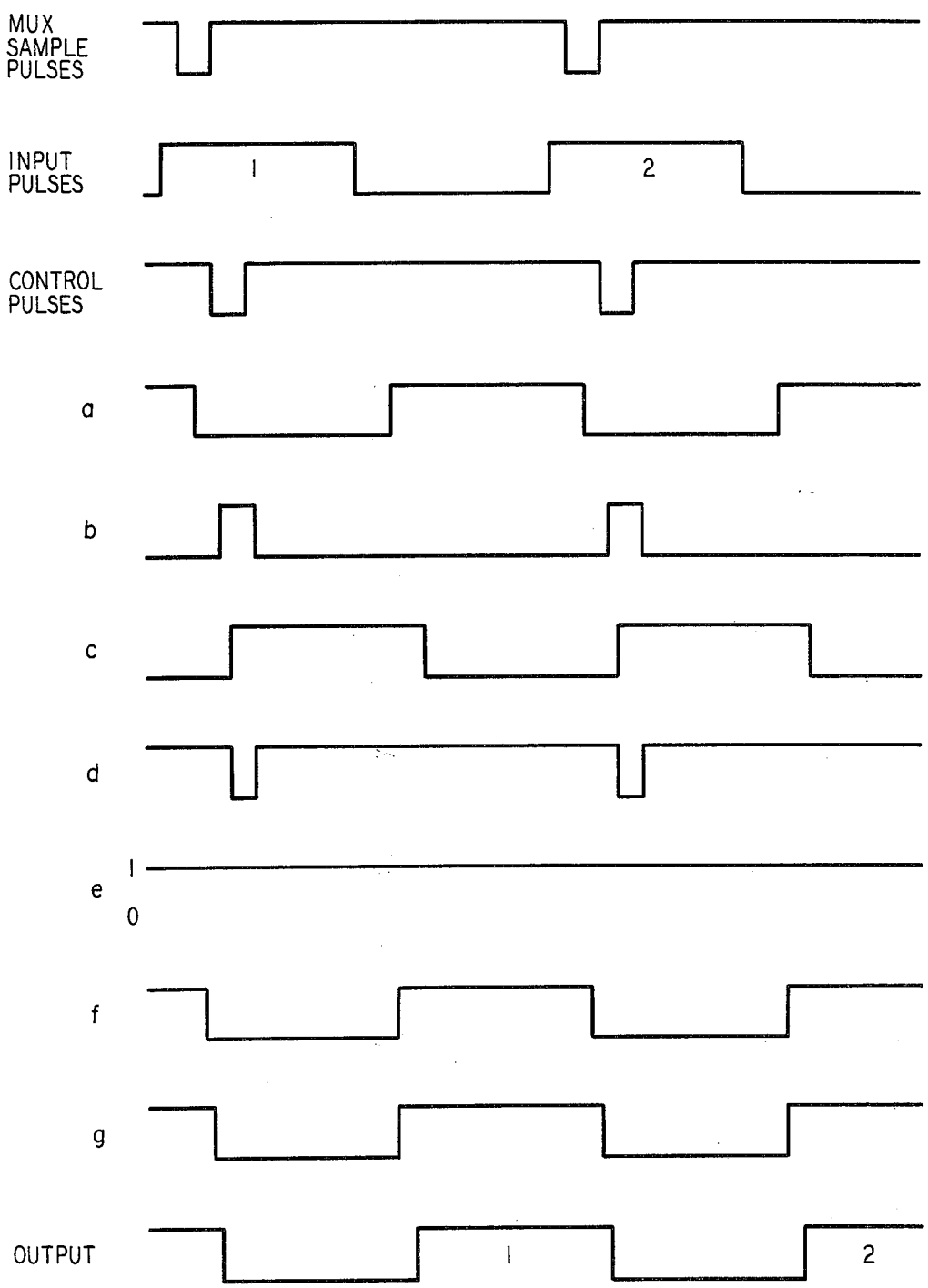
Figure 5:
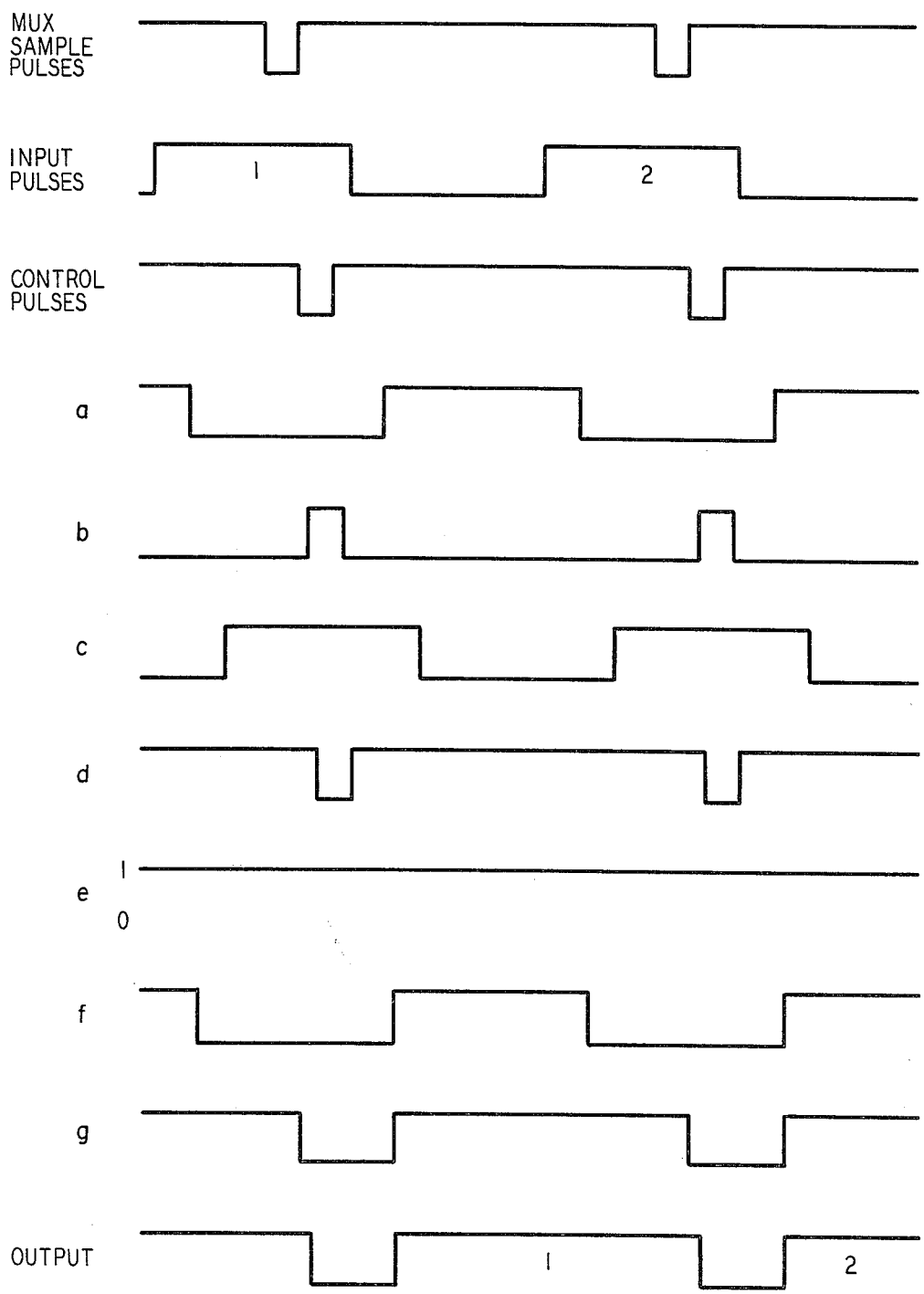
Figure 6:
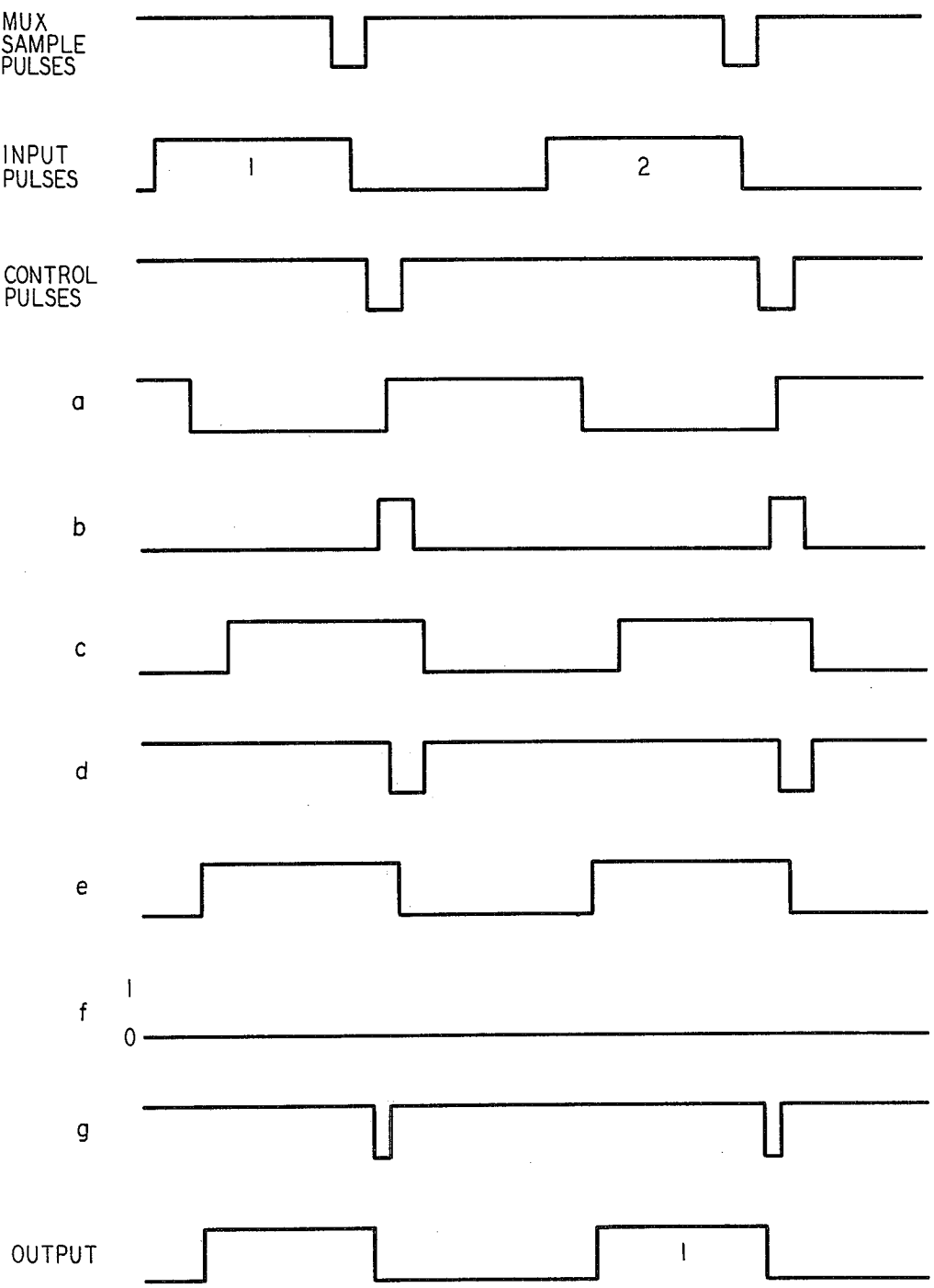
Figure 7:
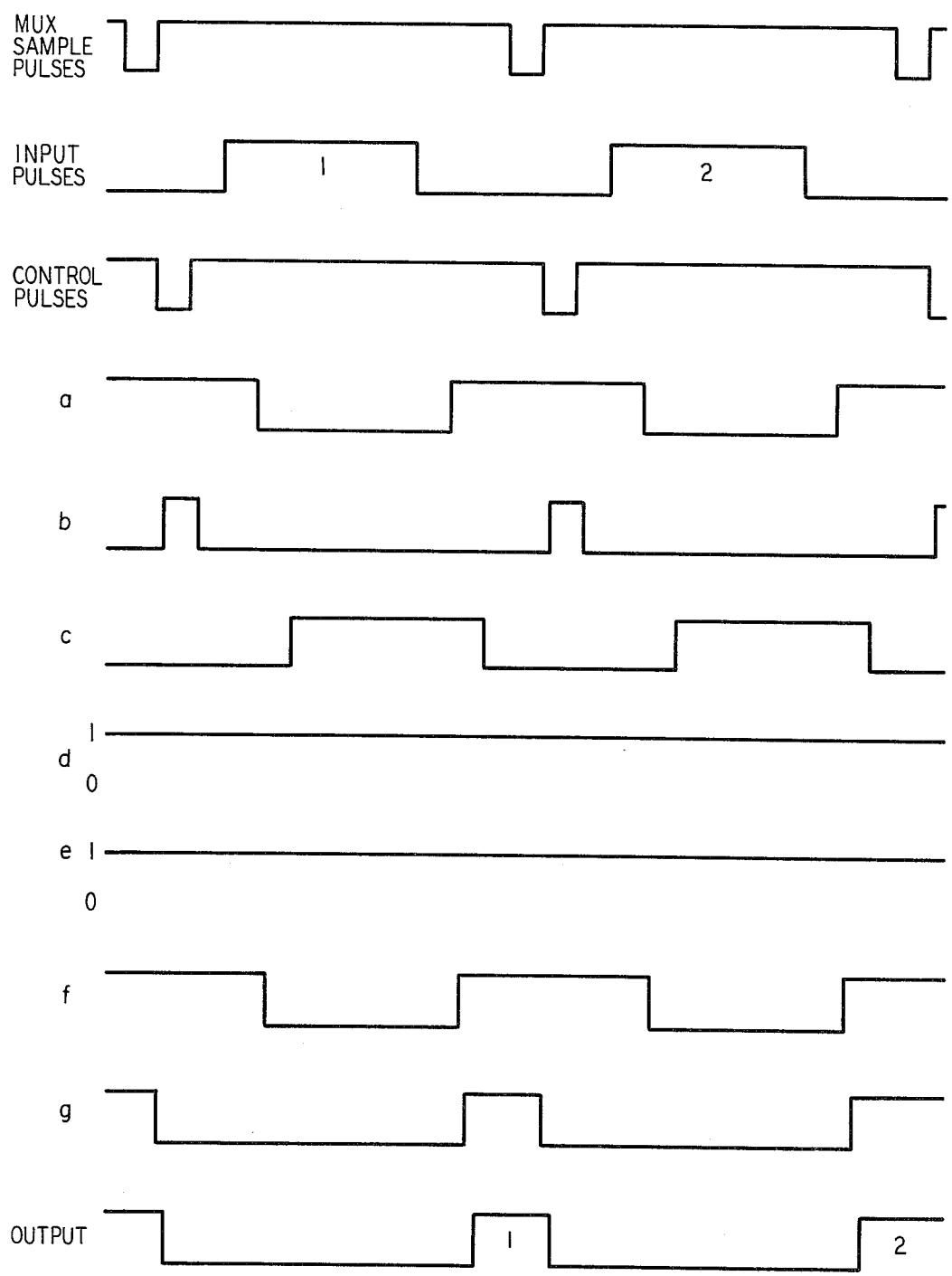

Turning now to FIG. 3 of the drawings, the first three waveforms illustrate the multiplexer sampling pulses, the input line pulses and the control pulses for a given line. The time diagram of FIG. 3 shows the condition in which the time position of the input pulse signal is such that a multiplexer sample pulse would sample, erroneously, a "zero" instead of a "one" in the input bit stream (i.e., compare the top two waveforms of FIG. 3). The waveform a shows the delayed (40–50 ns), inverted version of the input pulses at the output of isolator 24 and the waveform c shows these pulses further delayed and again inverted at the output of isolator 27. The control pulses are inverted in inverter 22 as shown in waveform b. Since all electronic circuit components incorporate some minimal delay, the pulses of waveform b are slightly delayed (several nanoseconds) with respect to the control pulse waveform thereabove. With the phase skewed pulses of waveforms b and c coupled to the input of NAND gate 23, the gate remains disabled and thus delivers a high clear input to flip-flop 25 (see waveform d). When the waveform a coupled to the preset input of flip-flop 25 goes low, it would be expected that the Q output would go high. However, with the D input terminal of flip-flop 25 coupled to +5V., the Q output is already high (Q = 1) and so it simply stays in the high state. The Q output of flip-flop 25 is illustrated by waveform e of FIG. 3.

The high or Q = 1 output signal of flip-flop 25 is coupled to AND gate 28, to the clear terminal of flip-flop 21, and to AND gate 26. This input signal to gate 26 serves to enable the same and thus the output of this gate (waveform f) is a delayed and inverted version of the input pulse signal delivered to the input of opto-isolator 24. That is, waveform f is a slightly delayed (some nanoseconds of circuit delay) version of waveform a — the output of isolator 24. The waveform f signal is the clock input to flip-flop 21. With this clock input f and the illustrated preset and clear inputs, the $\overline{Q}$ output of flip-flop 21 is an asymmetric pulse waveform (g). Each pulse of waveform g is an inverted shortened replica of an input line pulse. The positive ($\overline{Q}$ = 1) pulses of waveform g are produced as follows. With a positive transition in the pulse waveform f, $\overline{Q}$ goes high ($\overline{Q}$ = 1). A short time thereafter the control pulse waveform input to the preset terminal of flip-flop 21 goes low and this then sets the $\overline{Q}$ output low ($\overline{Q}$ = 0).

The Q = 1 output of flip-flop 25 serves to enable the AND gate 28 and thus the $\overline{Q}$ output of flip-flop 21 (waveform g) is transferred to the output of the time correction circuit. This "output" of the correction circuit is so designated in FIG. 3. A comparison of an output pulse (1) and a MUX sample pulse at the top of FIG. 3 shows that the "one" present on the input line will be sampled as a "one" in the multiplexer, in contrast to the result noted above without the time correction circuit.

FIGS. 4 through 7 show time diagrams for various other time relations between the MUX sample pulses and the input line pulses. That is, these figures show the sample pulses phase shifted by increasing amounts relative to the input pulses. The output pulse of the time correction circuit for each of these cases varies from a shortened or lengthened version of the input pulses to a shortened or lengthened version of the inverse of the input pulses. Considered another way, each output pulse is a selectively phase shifted version of each input line pulse and it is of shorter or longer duration in substantially every instance. Moreover, in all cases, the time position of the output pulses of the time correction circuit is such that a "one" is sampled if a "one" was present on the input line.

In view of the foregoing detailed explanation of the operation of the circuit of FIG. 2 and the relative simplicity and well known manner of operation of the circuit components utilized in the correction circuit, further detailed description of the waveforms of FIGS. 4–7 is considered to be neither necessary nor justified at this point. The letters that label the waveforms are keyed to the inputs and outputs of the circuit elements of FIG. 2 and thereby clearly explain the operation of these circuit elements to those skilled in the art.

When the control pulses and the transition of the input (T-1) pulses overlap in time, there can be an undefined state in the flip-flop 21 operation. This is due to a combination of factors; the finite rise-time of the pulses, the set-up and hold times of the circuit elements, and the circuit delay times. Experimentally, these factors combine to produce a 1 ns wide region out of the 647 ns in which a T-1 pulse transition can take place and in this 1 ns time slot the time correction circuit can produce an output that results in sampling into two time slots. This potential error region represents approximately 0.5° out of 360°. However, extra delay elements providing about 7 ns of delay can be included in the circuit so that an error phase condition can be readily corrected by appropriately adding delay into the line in question. To this end, a series (e.g., 3) of single input AND gates, symbolically represented by AND gate 29, can be permanently switched into the circuit as shown in FIG. 2 to correct for this error phase condition.

It is to be understood that the foregoing description is merely illustrative of the principles of the present invention and various modifications thereof may be devised by those skilled in the art without departing from the spirit and scope of the invention.

What is claimed is:

1. In a communication system wherein a plurality of incoming digital lines respectively deliver a plurality of digital message bit streams of predetermined bit rate to a digital multiplexer, said multiplexer serving to sample each input pulse on each incoming line, a time correction circuit for each incoming line characterized by means for making a relative time comparison of each input pulse on a line with a respective control pulse derived from a respective multiplexer sampling pulse, and means operative in response to each relative comparison to selectively invert and shorten or lengthen in a non-discrete manner each input pulse so that a portion of each input pulse will be in the proper time position to be correctly sampled by the multiplexer.

2. In a communication system as defined in claim 1 wherein said time correction circuit includes means for including a preselected amount of delay at a predetermined point in said circuit when said control pulse and a transition of said input pulse overlap to a given extent.

3. In a communication system wherein a plurality of incoming digital lines respectively deliver a plurality of digital message bit streams of predetermined bit rate to a digital multiplexer, said multiplexer serving to sample each input pulse on each incoming line, a time correction circuit for each incoming line characterized by means for making a relative time comparison of each input pulse on a line with a respective control pulse derived from a respective multiplexer sampling pulse, and means operative in response to each relative comparison to selectively phase shift and shorten or lengthen each input pulse in a non-discrete manner so that a portion of each input pulse will be in the proper time position to be correctly sampled by the multiplexer.

4. In a communication system as defined in claim 3 wherein said time correction circuit includes means for including a preselected amount of delay at a predetermined point in said circuit when said control pulse and a transition of said input pulse overlap to a given extent.

* * * * *